Figure 1:
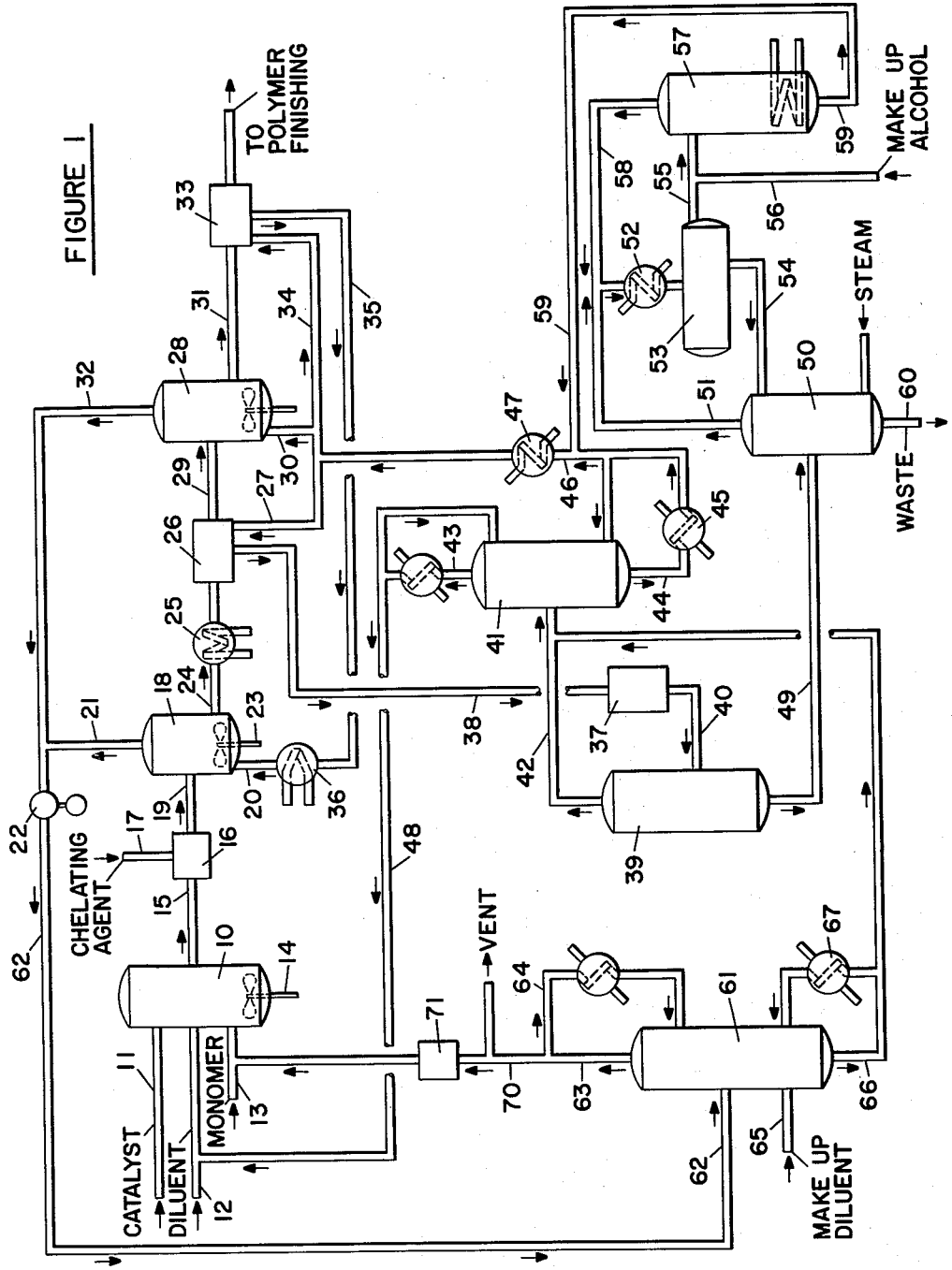

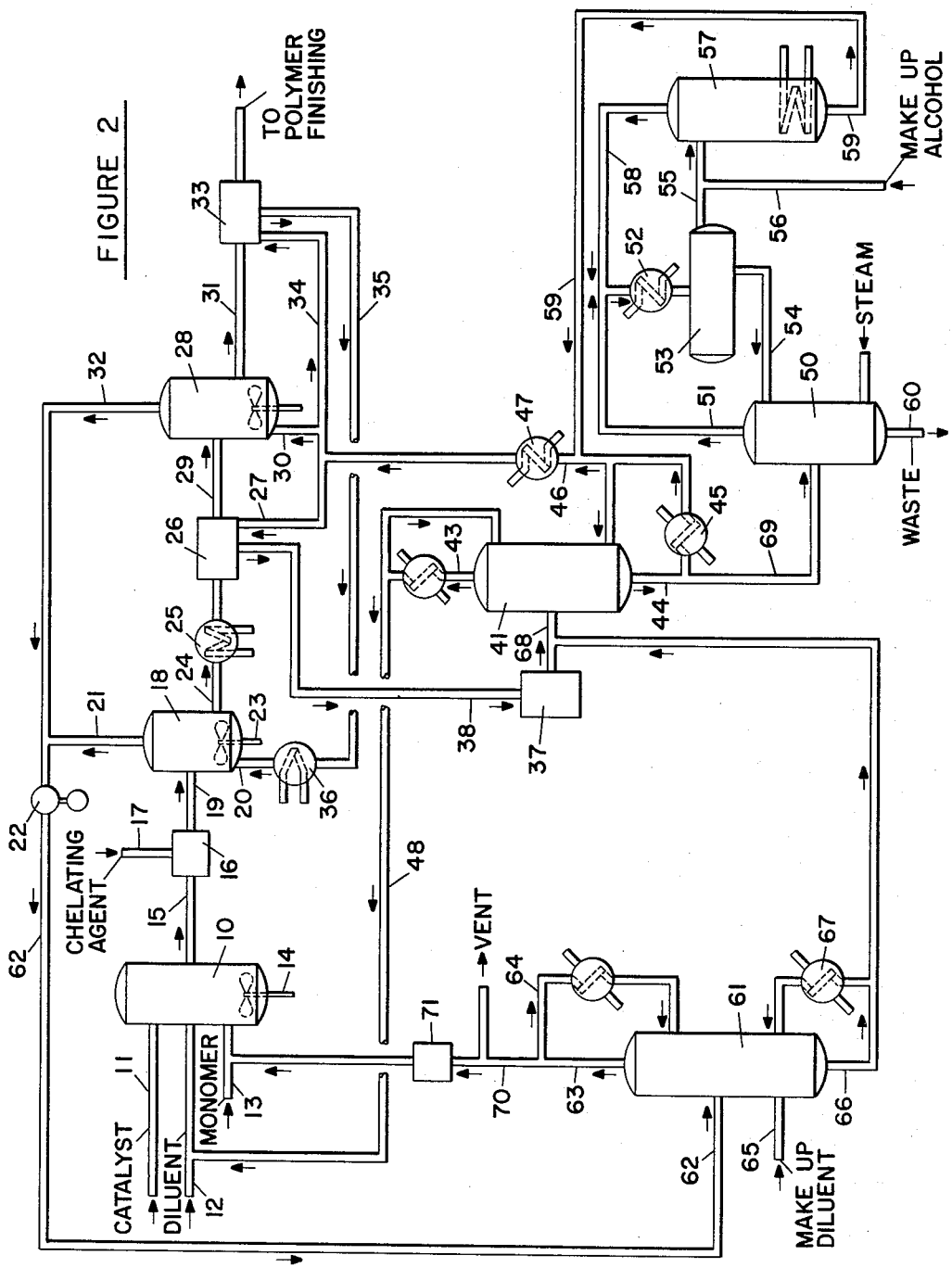

2,996,492
RECOVERY PROCESS FOR HIGH MOLECULAR WEIGHT POLYMERS
Bruce R. Tegge, Madison, and John F. Ryan, Westfield, N.J., assignors to Esso Research and Engineering Company, a corporation of Delaware
Filed Oct. 1, 1957, Ser. No. 687,485
13 Claims. (Cl. 260—93.7)

The present invention relates to the polymerization of olefins and, more particularly, to a novel process for treating and recovering high molecular weight polymers of olefins which have been prepared at relatively low pressures.

Heretofore polyolefins, such as polyethylene, have been polymerized at relatively low pressures, that is, not substantially exceeding atmospheric pressure, by employing various combinations of aluminum compounds and reducible heavy metal compounds as catalysts. Among the most active catalysts of this type are combinations of trialkyl aluminum or dialkyl aluminum halide with titanium halide, preferably in a partially reduced state. Under these conditions it is possible to obtain high molecular weight polymers having qualities that are very desirable for sundry applications. More recently, it has been found that by adjusting reactor conditions and by employing specific combinations of these aluminum and titanium compounds, it is possible to regulate the crystallinity or hydrocarbon solubility of the resulting polymer. Generally, the polymer product is broadly divided into two portions, namely, the crystalline part and the amorphous part. Since the latter is more soluble in the hydrocarbon diluent employed in the reactor, a considerable amount is usually unrecoverable in the conventional processes, especially the continuous processes.

It has now been discovered that by adding definite amounts of at least partially vaporized alcohols to the reactor effluent, it is possible to accurately control the amount of amorphous polymer in the final product. Furthermore, it has been discovered that by employing a low boiling diluent, which boils at a temperature at least 90° F. below the boiling point of the alcohol, the diluent can be easily stripped from the reaction mixture and the catalyst residues will be carried throughout the rest of the recovery process without decomposing or precipitating in the lines or in the towers. Finally, the alcohol in which the catalyst residues and alcoholates are dissolved may be recovered by steam stripping.

The advantages afforded by the various combinations of steps in this process will be seen in the subsequent description wherein reference will be made to the accompanying drawings in which:

FIGURE 1 is a schematic flowplan of a system adapted to carry out the process of the invention; and FIGURE 2 is a similar plan of a modification of the system shown in FIGURE 1.

Briefly, the principal novel steps in the present invention comprise contacting the reactor effluent with an at least partially vaporized $C_4$ alcohol under conditions such that a portion of the low boiling hydrocarbon diluent, which is another essential component, is driven off together with the unreacted monomers and other more volatile reactor constituents. The alcohol-diluent ratio in the polymer slurry leaving the flash drum should be from 2 to 10 and in most cases, where it is desired to recover from 75 to 95 wt. percent of amorphous polymer, the ratio should be from 4 to 6. The amount of amorphous polymer precipitated in the flash drum depends upon several factors, namely, the amount of alcohol injected into the flash drum, the temperature of the slurry in the drum, and the affinity of the particular diluent for the amorphous polymer. However, since the diluent and alcohol can be controlled by merely selecting the ones most suitable for a particular operation, the temperature and amount of alcohol added in the flash drum are the two conditions which may be readily varied to adjust the properties of the polymer. Thus at low flash drum temperatures, injecting large amounts of vaporized alcohol will result in a polymer product having more amorphous polymer than where the flash drum is maintained at a high temperature level and only a relatively small amount of vaporized alcohol is injected into the reactor effluent. As already mentioned, the boiling range of the diluent is an important feature in the invention insofar as it is necessary to have a boiling point differential between the diluent and alcohol of at least 90° F. and preferably 125° F. or more, say, between 125 and 175° F.

The slurry leaving the flash drum contains polymer, alcohol, some diluent, and the catalyst residue in the form of alcoholates. After separating the insoluble polymer from the soluble slurry components by any conventional means such as a rotary filter or a centrifuge, the alcoholate and amorphous polymer are separated from the diluent, unreacted alcohol and whatever unreacted monomers may be present by vaporization. The higher boiling residues and remaining alcohol are then subjected to a steam stripping operation from which the remaining alcohol is recovered in the overhead vapor and the catalyst residues and amorphous polymer are recovered by filtering the aqueous slurry or otherwise discarded. The first named filtrate may either be sent directly to a conventional fractionating tower for separating diluent and alcohol from amorphous polymer and alcoholate, or it may be transferred to an evaporator in which the diluent and alcohol are stripped in the presence of a higher boiling solvent such as xylene, in which case the alcoholate and amorphous polymer are recovered in a hydrocarbon solution and the diluent and alcohol taken overhead are transferred to the conventional diluent alcohol separating tower.

Aside from the novel features of the invention discussed above, conditions of catalyst composition and preparation as well as of the polymerization reaction itself may be those heretofore used in the specific art of low pressure olefin polymerization. Thus, a list of reducing catalyst components of outstanding utility includes the following aluminum compounds: tri-n-octyl aluminum, tri-isobutyl aluminum, tripropyl aluminum and triethyl aluminum, and dialkyl aluminum halides, such as diethyl aluminum halides, particularly chlorides, bromides and fluorides. Useful aluminum compounds of somewhat lower reducing activity include the following: dimethly aluminum halides, trimethyl aluminum, methyl and ethyl aluminum dihalides, higher dialkyl aluminum halides and trialkyl aluminum compounds having alkyl groups higher than about $C_{10}$. Mixtures of aluminum alkyls can also be used to reduce the heavy metal compounds. For example, mixtures containing ethyl aluminum dichloride and diethyl aluminum chloride have been successfully used to produce active catalysts in this manner. Similarly, mixtures of ethyl aluminum dichloride and triethyl aluminum or of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron-attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Reducible heavy metal compounds suitable for the purposes of the invention include such inorganic compounds as the halides, oxyhalides, complex halides, oxides, hydroxides, and organic compounds, such as alcoholates, acetates, benzoates and acetyl acetonates of the transition metals of the IV, V, VI and VII periods of the periodic system, e.g., titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are relatively readily reducible: titanium tetrabromide, titanium tetrachloride and zirconium acetylacetonate. The relatively difficult reducible compounds include ferrous chloride, chromic chloride and manganese chloride.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component. These catalysts are preferably pretreated at carefully controlled temperatures for about 5–20 minutes. The optimum pretreating temperature for a catalyst prepared from diethyl aluminum chloride and titanium tetrachloride lies between about 100° and 150° F.

The catalysts are quite generally prepared by intimately mixing the aluminum compound or other reducing component and the heavy metal compound preferably in a solvent or diluent and in a non-oxidizing atmosphere while stirring. Paraffinic hydrocarbons, such as heptane or other saturated petroleum or synthetic hydrocarbon oils, are the most suitable solvents.

The molar ratio of the aluminum compound to the heavy metal compound in the catalyst mixture may vary widely. In general, the higher the polymer molecular weight desired the higher should be this ratio. A preferred molar ratio for alkyl aluminum compounds to titanium tetrachloride for making polymers above 20,000 molecular weight is about 1–12:1, molar ratios of 1–6:1 and even substantially equimolar proportions, based on metal, being suitable in many cases.

The polymerization conditions depend somewhat on the specific olefin involved and on the type of polymer desired. Ethylene is the preferred olefin although higher olefins, such as propylene, butylenes, styrene, hexadecene, butadiene, etc., may be used alone or in mixtures. In the case of ethylene, the polymerization is carried out either by predissolving the ethylene in the diluent feed as above described or by bubbling the ethylene into a suspension of the catalyst in an inert solvent or diluent comprising the evaporating liquid of the invention. Neither the polymerization temperature nor the polymerization pressure is particularly critical for the chemistry of the polymerization reaction. It is preferred, however, to operate at reactor temperatures of about 32°–300° F., such as 80–200° F. Pressures ranging anywhere from atmospheric or sub-atmospheric to 100 atmospheres have been used heretofore in the low pressure polymerization of ethylene and other olefins on catalysts of the type improved by the present invention. Similar pressures may be used for the process of the invention.

The reaction is preferably carried out under careful exclusion of oxygen while stirring in batch or continuous operation. When operating batchwise, olefin introduction is continued until the catalyst is exhausted and the reaction ceases.

The amount of catalyst used may vary within wide limits depending somewhat on the purity of the olefin feed. Proportions of as little as 0.1 part by weight of active catalyst constituent per 100 parts by weight of olefin are sufficient if the feed is pure. With olefin feed streams containing about 0.01 wt. percent of water, oxygen, carbon dioxide or certain other oxygenated compounds, catalyst proportions of about 0.5–5 wt. percent on the same basis are usually adequate.

While higher boiling diluents may be used in the preparation of the catalyst, it is essential to use a lower boiling hydrocarbon as the diluent in the polymerization zone. The highest boiling diluent tolerable under the conditions of the present process is an isomeric $C_6$ paraffin which does not boil above about 150° F. The preferred aliphatics are the $C_3$–$C_5$ paraffins boiling at a temperature not higher than about 100° F., say 70 to 100° F. While normal paraffins may be employed, such as propane, n-butane or n-pentane, the best results are obtained with isomeric or non-normal paraffins, and particularly with isopentane. For the sake of convenience and economics, the minimum boiling point of the solvent should not be below about −50° F. The polymer concentration in the diluent may vary from 5 to 20 wt. percent but, for most purposes, it is generally from 10–15 wt. percent.

Upon leaving the reactor the effluent is contacted with a non-aqueous liquid wash solution containing a chelating agent. For the purpose of the present invention the solution should comprise $C_4$ alcohol so that there will be no mixture of alcohols in the flash drum wherein $C_4$ alcohol is injected in an at least partially vaporized state. The chelating agents found most useful are the 1,3-dicarbonyl compounds such as diketons, keto esters and keto acids. The preferred chelating agents are acetylacetone and ethylacetoacetate because these agents are particularly effective in the case of aluminum and titanium compounds. In most instances the wash solution will contain about 99.0–99.9% $C_4$ alcohol and about 0.1–1.0% of the chelating agent. The amount of solution employed will depend upon the amount of catalyst employed and other factors, but generally only enough chelating agent is added to combine with the metals in the catalyst, that is to say that about 0.5 to 3.0, preferably 1.2 to 1.8, moles, of chelating agent are used for every mole of catalyst. If desired, the chelating agent may be recovered by any suitable means after the diluent and alcohol have been separated from the catalyst residue.

After contacting the effluent with the chelating agent for a suitable period of time, the reactor effluent is charged into a flash drum where it is contacted with a $C_4$ alcohol in an at least partially vaporized state. The contacting is carried out in such a manner that a substantial portion of the low boiling diluent and unreacted monomer are flashed off. The slurry in the flash drum is generally maintained at a temperature of about 50–240° F. and at a pressure range from 0 to 50 p.s.i.g. The preferred temperature and pressure are 100–190° F. and 5–10 p.s.i.g., respectively. The vaporized alcohol, which serves as a source of heat and therefore may be used to regulate the temperature of the flash drum, partially replaces the diluent originally present in the reactor effluent so that the slurry leaving the drum has an alcohol diluent ratio in parts by weight of from 2 to 10. While the vaporized alcohol may be added in any one of several ways, it is generally desirable to inject it into the base of the flash drum so that it will be disseminated throughout the reactor effluent with the aid of a suitable agitating means. The flash drum operation is usually a continuous step and therefore the inflow and outflow of the slurry should be adjusted to permit the optimum amount of diluent to be removed and amorphous polymer to be precipitated. Again, the amount of alcohol added will vary depending upon the amount of amorphous polymer desired in the final product. For instance, anywhere from 3 to 6 parts by weight of normal butyl alcohol at a temperature of, say, 245° F. will be contacted with 1 part by weight of isopentane in the reaction mixture so as to produce a slurry containing about 6 parts of butyl alcohol for each part of, say, isopentane. Other suitable $C_4$ alcohols include, isobutyl alcohol, secondary butyl alcohol and tertiary butyl alcohol.

The temperature of the alcohol added to the flash drum may be as low as 100° F. or as high as 280° F., depending upon the flash tank pressure, the particular alcohol and the amount of vapor or liquid alcohol to be added. For most purposes, it is suitable to add the alcohol at a temperature, 150 to 250° F. and preferably at a temperature which is slightly above the boiling point of the particular alcohol.

The flash drum overhead may be compressed and sent to a splitter tower which separates the diluent from the unreacted monomers. The unreacted monomers can be recycled to the reactor after they have been passed through an alumina gel adsorber to remove any impurities which may be present. The bottoms or polymer slurry in the flash drum is then transferred to a suitable separating means such as a rotary filter or centrifuge. The polymer cake recovered is generally washed with the same alcohol used in the flash drum to remove any occluded contaminants. The filtering and washing steps may take place concurrently at room temperature. The filtrate may be transferred either to an evaporator which will strip off both the alcohol and diluent overhead or directly to the diluent alcohol separation tower which is also used to separate the evaporator overhead stream. In either case the filtrate is contacted with a neutralizing agent such as ammonia, hexylamine, monomethyl amine, or any other basic organic nitrogen-containing compound prior to separating the alcohol and diluent from the catalyst residue, etc. The neutralization may be accomplished by any conventional technique such as simply bubbling ammonia through the filtrate until the pH of the solution is between 7 and 10 and preferably about 8. The amount of ammonia should not exceed that required for neutralization but more than 5 to 20% in order to avoid the formation of metal hydroxides. Also, air or oxygen should be carefully excluded during the quenching and neutralization steps to prevent the formation of insoluble metal compounds. The neutralizing step and the use of a slight stoichiometric excess of chelating agent over the catalyst residues present, dispose to obtain a polymer having a low ash value and at the same time avoid corrosion generally caused by the hydrogen halides formed by the catalyst residue.

The filter cake recovered from the separating means is then transferred to a washing vessel wherein it is contacted countercurrently with additional alcohol at a temperature of 100 to 200° F. At this point the filter cake comprises about 20–45 wt. percent of polymer and 80–55 wt. percent alcohol. The amount of alcohol contacted with the filter cake will vary between about 1 to 3 parts by weight for each part of filter cake. The countercurrent washing may take place in any suitable vessel appropriately fitted with agitating means. The wash polymer is then sent to another separating means such as a rotary filter or a centrifuge where it is again filtered and washed as before. However, since the filtrate from this second separation step comprises substantially pure alcohol, it may be heated in a steam heater and injected into the flash drum in the form of a vapor. The polymer cake recovered from this step consists of approximately 40 wt. percent polymer and 60 wt. percent alcohol. The alcohol may be removed by vacuum drying or any other conventional technique and the polymer is dried in the absence of air at a temperature of, say, 150–200° F. depending upon its melting or softening temperature. The powder or crumb which is obtained can be heated to a temperature of about 350–400° F., extruded as strands or as a strip through a die plate into a cold water bath and thereafter diced or pelletized into a suitable form for bagging, packaging and shipping. For example, the extruded polymer can be cut into small particles by means of a dicer. The alcohol recovered during the drying steps may be recycled to the filters or the flash drum.

As mentioned above, the filtrate from the first separating means may be transferred to an evaporator which strips off the alcohol and remaining diluent from the filtrate. The liquids are usually stripped off at a temperature of 250 to 350° F. under from 0 to 30 p.s.i.g. of pressure. A higher boiling liquid, such as a hydrocarbon boiling above say 250° F., preferably about 280–400° F., may be constantly injected into the evaporator at a rate such that the polymer residue, amorphous polymer and ammonium halide salt are removed from the bottom of the evaporator in a concentration ranging from about 1 to 15 wt. percent. Suitable hydrocarbons include petroleum hydrocarbons, especially aromatic hydrocarbons, e.g. m-, p- or o-xylene. The evaporator may be equipped with a steam heater which will maintain the temperature at the desired level. According to this preferred embodiment the alcohol and diluent taken overhead is then sent to a diluent-alcohol separating tower wherein the alcohol is taken off as a bottoms product, and recycled to the flash drum or countercurrent washing vessel. The diluent is taken off overhead at a temperature of from 100 to 160° F. at a pressure of 5 to 35 p.s.i.g. It may also be water washed and dried with alumina gel before being recycled to the reactor to remove traces of ammonia and alcohol.

The catalyst residue and amorphous polymer solution recovered from the bottom of the evaporator is then transferred to a steam stripper operated at a temperature of 220 to 250° F. and under from about 5 to 20 p.s.i.g. pressure where the alcohol is taken overhead in the form of an azeotrope consisting of 75 wt. percent alcohol and 25 wt. percent water. The azeotrope is sent to a settling zone wherein the water phase is removed as the bottom layer and returned to the steam stripper while the upper butanol phase is combined with makeup alcohol and fed to the top of an alcohol drying tower and the overhead vapor from the drying tower is near the azeotrope composition and flows to the same condenser as the steam stripper azeotrope vapor. The condensate from the common condenser is then settled to separate the water and butanol liquid phase. The dry alcohol from the bottom of the drying tower is then recycled to the flash drum and wash system.

The bottoms product from the steam stripper consists of catalyst residues, a nitrogen-containing salt, such as ammonium chloride, and amorphous polymer. If desired, the amorphous polymer may be recovered according to know techniques.

The molecular weights of the polymers so produced may fall within the range of 2,000 to 200,000 or as high as 3,000,000 or more as determined by the intrinsic viscosity using the I. Harris Correlation (Journal of Polymer Science, 8, 361 (1952)). Specific molecular weights will depend on the numerous process variables many of which are interdependent. The polymers will comprise from 60 to 90 wt. percent crystalline polymer and from 40 to 10 wt. percent amorphous polymer depending upon the conditions used in the flash drum. The polymers have many commercial applications as structural material, tubing and molded products. They are particularly suitable as containers, whether of the rigid bottle type or the flexible wrapping film type.

The invention will be best understood from the following detailed description wherein specific references will be made to the drawings.

Referring now to FIGURE 1 of the drawing, the system illustrated therein will be explained in terms of an actual example. It is, of course, understood that the system described may be applied in an analogous manner to the polymerization of other low molecular weight olefins with different catalysts.

The system illustrated by FIGURE 1 essentially comprises a continuous process for preparing a polymer of propylene having varying amounts of amorphous polymer in the final product. In operation, the polymerization reactor 10 is supplied with a catalyst slurry prepared in equipment which is not shown. The catalyst slurry, which consists of the reaction product of equimolar proportions of triethyl aluminum and titanium tetrachloride in a concentration of 1.6 wt. percent in isopentane, enters the reactor via line 11 at a rate of 70 lbs./hr. Simultaneously, reactor 10 is fed with 646 lbs./hr. of isopentane and 67 lbs./hr. of n-pentane via line 12. At this point the catalyst concentration in reactor 10 is 0.2 wt. percent. Propylene feed of 95% propylene and 5% propane is supplied to reactor 10 via line 13 at a rate of 113 lbs./hr. The reaction mixture is thoroughly mixed by means of a conventional stirrer 14 and the pressure in reactor 10 is maintained at about 60 p.s.i.g. while the temperature is controlled at about 160° F. After a nominal residence time of one hour, an effluent containing 22 lbs./hr. of unreacted monomer, 6 lbs./hr. of propane, 716 lbs./hr. of isopentane, 67 lbs./hr. n-pentane and 87 lbs./hr. of polymer is continuously withdrawn from the reactor via line 15 and transferred to a quenching zone 16 wherein 1.5 lbs./hr. of acetyl acetone (2 wt. percent in normal butyl alcohol solution) is intimately contacted with catalyst in the reactor effluent. The chelating agent enters the quenching zone via line 17 and is dispersed through the reactor effluent slurry by means of a suitable agitating means. After a nominal 10 minute residence time in the quenching zone, the slurry is transferred continuously to flash drum 18 via line 19 where it is intimately contacted with vaporized n-butyl alcohol entering the drum via line 20. The alcohol addition, at 180° F. drum temperature and under 15 p.s.i.g. of pressure, is at the rate of 636 lbs./hr. The temperature in the drum 18 is maintained at 180° F. by a heater 36 through which 187,000 B.t.u. pass per hour. 633 lbs./hr. of isopentane, 58 lbs./hr. of n-pentane, 21.6 lbs. of unreacted propylene, 9.7 lbs./hr. of propane, and 102 lbs./hr of n-butanol are removed overhead via line 21 and passed through compressor 22.

The flash drum is equipped with a suitable stirrer 23 which insures intimate contact of the n-butyl alcohol vapors, which are at a temperature of 290° F., entering the base of the drum 18 with the polymer slurry contained therein. The slurry leaving the flash drum via line 24 contains 83 lbs./hr. of isopentane, 9 lbs./hr. of n-pentane, 0.4 lb./hr. of propylene, 0.3 lb./hr. of propane, 636 lbs./hr. of alcohol and 87 lbs./hr. of polymer. The slurry is passed through a suitable cooling means 25 to reduce its temperature to about 100° F. before filtering it in a rotary filter 26 at 100° F. and 0.2 p.s.i.g. pressure. During the filter operation in filter 26, the polymer cake (350 lbs./hr.) which contains about 25 wt. percent polypropylene is continuously washed with 382 lbs./hr. of additional n-butyl alcohol entering through line 27. The filter cake is then transferred to a wash drum 28 via line 29 wherein it is countercurrently contacted with n-butyl alcohol entering the wash drum through line 30. In the wash drum the filter cake is countercurrently contacted with the alcohol so that 783 lbs./hr. of alcohol are contacted with 87 lbs./hr. of polymer. The reslurried polymer cake leaves the wash drum via line 31 at a temperature of 100° F. Any unreacted monomer is removed overhead in the wash drum through line 32 which is connected with line 21 of the flash drum. The reslurried polymer cake then is put through an automatic cycle centrifugal filter 33, where it is subsequently washed with 522 lbs./hr. of fresh n-butyl alcohol entering through line 34. The filtrate, which consists essentially of n-butyl alcohol, is recycled to flash drum 18 via line 35 through heater 36 which brings the temperature of the alcohol up to 290° F. The polymer cake is then vacuum dried at 175° F. under 1.7 p.s.i.a. pressure, extruded and diced according to conventional techniques.

The filtrate from rotary filter 26 enters neutralization zone 37 via line 38 where it is contacted with ammonia gas until the pH is 8.0. The neutralized filtrate is transferred to evaporator 39 via line 40 where the n-butyl alcohol and isopentane are flashed off at a pressure of 20 p.s.i.g. and a temperature of 270° F. The diluent and alcohol are carried to a diluent-alcohol separating tower 41 by means of line 42 where isopentane and butyl alcohol are separated under 15 p.s.i.g. pressure and at 120° F. top and 290° F. bottom temperatures. The isopentane is removed from the top of the tower via line 43 and a portion of the distillate is refluxed to tower 41 while another portion is water washed and dried over alumina gel before recycling to the reactor. The butyl alcohol is removed from tower 41 as a bottoms product through line 44 and a portion is returned to tower 41 after passing through reboiler 45 while a second portion is pumped through line 46, passed through condenser 47 and from there used to wash the polymer cake in the rotary filter 26, the wash drum 28 and the centrifugal filter 33. The isopentane taken overhead is recycled through line 48 to the reactor via line 12. The catalyst residue, amorphous polymer, salt, and some butanol is withdrawn from the bottom of evaporator 39 through line 49 and transferred to steam stripper 50 where it is steam stripped at 220° F. to remove the remaining n-butyl alcohol. The alcohol-water azeotrope is taken overhead through line 51 and passed through a condenser 52 terminating in separating tank 53. The azeotrope, which consists of 75 wt. percent of n-butyl alcohol and 25 wt. percent water, separates into two separate layers, the lower of which consists of water which is recycled to the steam stripper 50 via line 54. The upper layer consists of substantially water-free n-butyl alcohol and is removed from the separating zone 53 via line 55 where it is blended with make-up n-butyl alcohol entering by means of line 56 and the blend is charged into drying tower 57 wherein the remaining water is separated from the n-butyl alcohol and taken overhead through line 58, condensed and returned to settling tank 53. The dried n-butyl alcohol, which has been stripped in drying tower 57 at 245° F. and under 5 p.s.i.g. of pressure to distill overhead any water (as azeotrope), is recycled via line 59 which connects with line 46. The ammonium chloride salt, catalyst residue, and amorphous polymer, which is removed from the steam stripper via line 60, may be either discarded as waste or the desired components may be recovered by conventional techniques.

The monomers and diluent taken overhead from flash drum 18 are compressed and transferred to a diluent-monomer separating tower 61 via line 62. Here the unreacted monomer and diluent are compressed to 210 p.s.i.g. at 296° F. and fed to the diluent-monomer tower. About 203 lbs./hr. of monomer and diluent are taken overhead through line 63, 170 lbs./hr. being recycled to the diluent-monomer separator 61 through line 64 while 33 lbs./hr. is vented through line 70 in order to purge accumulated unreacted propane. If desired, this stream may be recycled to the reactor 10 after fractionation in zone 71 and passage through an alumina gel adsorber tower, not shown, to remove any impurities. Makeup diluent is charged into the diluent-monomer separator 61 via line 65 and a stream containing 631 lbs./hr. of isopentane, 58 lbs./hr. of n-pentane and 102 lbs./hr. of alcohol is withdrawn from the bottom of the diluent-monomer separator 61 via line 66 and a portion is passed through a reboiler 67 and returned to the separator 61 while a second portion is pumped directly to line 42 which combines with the n-butyl alcohol and isopentane mixture which is taken overhead from evaporator 39.

The polypropylene recovered from the foregoing process has a Harris molecular weight of 105,000 (or an intrinsic viscosity of 2.7), a softening point of 320° F. and a melting point of 335° F., and contains 79 wt. percent crystalline polypropylene and 21 wt. percent amorphous polypropylene.

Referring now to FIGURE 2, which is a modification of the embodiment shown in FIGURE 1, the principal difference is that evaporator 39 is eliminated and the filtrate from the filter 26 is passed directly to the diluent-alcohol separator tower 41 after it has been treated with ammonia gas as before in zone 37. The neutralized filtrate is transferred to the diluent-alcohol separating tower 41 by means of line 68. A further difference is that the amorphous polymer, catalyst residue, and ammonium chloride present in the filtrate must be removed as a bottoms product from tower 41 via lines 44 and 69 through which it is transferred to steam stripper 50 to be separated from any residual n-butyl alcohol in the same manner described above. However, in this embodiment the recycled n-butyl alcohol obtained from the diluent-alcohol separating tower 41 must be separated from the catalyst residue by means of reboiler 45.

The polypropylene recovered from the foregoing process has an intrinsic viscosity of 2.5, a softening point of 305° F. and a melting point of 320° F. and contains 74 wt. percent crystalline polypropylene and 26 wt. percent amorphous polypropylene.

The invention is not limited to the specific figures of the foregoing examples. The relative proportions of materials used and the reaction conditions may be varied within the limits indicated in the specification to obtain polymers possessing the desired characteristics.

What is claimed is:

1. The process of polymerizing propylene to form normally solid polypropylene by contacting it with a catalyst consisting of an at least partially reduced titanium halide activated with an organo-metal compound at a temperature of 80–200° F. under a pressure of from atmospheric to 100 atmospheres in the presence of a $C_3$–$C_6$ aliphatic hydrocarbon diluent until it has the desired average molecular weight, quenching the catalyst with about the stoichiometric amount of a chelating agent, injecting an at least partially vaporized $C_4$ alcohol having a boiling point at least 90° F. higher than said hydrocarbon diluent into the polymerization mixture at a temperature sufficient to flash off at least a portion of the diluent and recover a slurry containing an alcohol to diluent ratio of from 2:10, the amount of $C_4$ alcohol added and the amount of diluent flashed off being controlled responsive to the amount of crystalline polymer desired in the final polymer product such that from 70 to 90 wt. percent crystalline polymer is obtained separating the solid polymer from the filtrate, separating the diluent and uncombined alcohol from the filtrate, steam stripping the rest of the filtrate to recover any combined alcohol, reslurrying the separated polymer with additional alcohol, separating the polymer from the alcohol and recovering polypropylene having an intrinsic viscosity between 2.5 and 2.8, a melting point between 300 and 350° F. and containing 70 and 90 wt. percent crystalline polymer.

2. The processing according to claim 1 in which the diluent and uncombined alcohol are separated from the filtrate by evaporating them in the presence of a higher boiling diluent leaving the rest of the filtrate in said higher boiling diluent.

3. The process according to claim 1 in which the combined alcohol is removed in the steam stripper as a water-alcohol azeotrope.

4. The process according to claim 1 in which the boiling point of the alcohol is from 125 to 175° F. above the boiling point of the diluent.

5. The process according to claim 1 in which the diluent is an isoparaffin.

6. The process according to claim 1 in which the diluent is isopentane and the alcohol is n-butyl alcohol.

7. In a process for polymerizing olefins to form normally solid olefin polymers by contacting an olefin under polymerization conditions in a hydrocarbon diluent with a polymerization catalyst comprising a reducing material and a reducible heavy metal compound of the transition metals of the IV–VII periods of the periodic system to form a reactor effluent containing polymer product, the improvement which comprises (1) employing as diluent a hydrocarbon having a boiling point in the range of −50° to +150° F., (2) adding an at least partially vaporized $C_4$ alcohol to the reactor effluent maintained at a temperature in the range of 50–240° F. and at a pressure of from 0–50 p.s.i.g to flash off a substantial portion of said low boiling hydrocarbon diluent, the amount of $C_4$ alcohol added, and the temperature and pressure of the reactor effluent being controlled responsive to the quantity of amorphous polymer desired in the polymer product, and (3) recovering a polymer containing a desired amount of amorphous polymer; said alcohol having a boiling point at least 90° F. higher than that of said hydrocarbon diluent.

8. A process according to claim 7 wherein the low boiling hydrocarbon diluent has a boiling point from 125 to 175° F. lower than that of said $C_4$ alcohol.

9. The process of claim 7 wherein said low boiling hydrocarbon diluent is a $C_3$ to $C_5$ hydrocarbon boiling in the range of 70 to 100° F.

10. The process of claim 7 wherein the at least partially vaporized $C_4$ alcohol is added at a temperature in the range of 100° F. to 280° F.

11. The process for treating a reactor effluent having as diluent a low boiling hydrocarbon of boiling point not above 150° F. and containing a high molecular weight polyolefin to control the quantity of amorphous polyolefin in the final polyolefin product comprising treating the reactor effluent with an at least partially vaporized $C_4$ alcohol at a temperature sufficient to flash off a substantial portion of said low boiling hydrocarbon, the amount of alcohol introduced and the amount of hydrocarbon flashed off being controlled responsive to the quantity of amorphous polymer desired in the final polyolefin product; said alcohol having a boiling point at least 90° F. higher than the boiling point of said low boiling hydrocarbon.

12. The process of claim 11 wherein the alcohol diluent ratio is in the range of from 2 to 10.

13. The process of claim 11 wherein the low boiling diluent boils at from 125 to 175° F. below that of said $C_4$ alcohol.

References Cited in the file of this patent

UNITED STATES PATENTS

| | | |
|---|---|---|
| 2,121,731 | Collings | June 21, 1938 |
| 2,731,453 | Field et al. | Jan. 17, 1956 |
| 2,814,610 | Braidwood et al. | Nov. 26, 1957 |
| 2,825,721 | Hogan et al. | Mar. 4, 1958 |
| 2,832,759 | Nowlin et al. | Apr. 29, 1958 |
| 2,842,532 | Campbell | July 8, 1958 |
| 2,874,153 | Bowman et al. | Feb. 17, 1959 |
| 2,890,214 | Brightbill et al. | June 9, 1959 |

FOREIGN PATENTS

| | | |
|---|---|---|
| 538,782 | Belgium | Dec. 6, 1955 |